US006447707B1

(12) United States Patent
Sakai et al.

(10) Patent No.: US 6,447,707 B1
(45) Date of Patent: Sep. 10, 2002

(54) MOLDING METHOD OF THERMOSETTING RESIN AND MOLD WITH UNNECESSARY GAP HEATING

(75) Inventors: Kenichi Sakai, Yokohama; Susumu Shimada, Tsukuba; Masaaki Kumamura; Masahiro Watabe, both of Yokohama; Kentaro Niwano, Yamato, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/389,363

(22) Filed: Sep. 3, 1999

(30) Foreign Application Priority Data

Sep. 8, 1998 (JP) .......................................... 10-254287

(51) Int. Cl.[7] .......................... B29C 45/72; B29C 33/08

(52) U.S. Cl. .................. 264/478; 264/327; 264/328.16; 425/547; 425/407; 425/812

(58) Field of Search .............................. 264/478, 271.1, 264/276, 279, 327, 328.16, 102, 161, 328.14; 425/127, 546, 543, 547, 420, 806, 812, 407; 249/141

(56) References Cited

U.S. PATENT DOCUMENTS 3,790,650 A * 2/1974 Heier
5,064,585 A * 11/1991 Cooper et al. ............. 264/40.6
5,266,259 A * 11/1993 Harrison et al. ............ 264/327
5,368,805 A * 11/1994 Motai .................... 264/328.16
5,759,456 A * 6/1998 Watanabe et al. ...... 264/328.16
5,885,504 A * 3/1999 David et al. ........... 264/328.16

* cited by examiner

*Primary Examiner*—Jill L. Heitbrink
(74) *Attorney, Agent, or Firm*—Fitzpatrick, Cella, Harper & Scinto

(57) ABSTRACT

There is provided a molding method of a thermosetting resin in which the formation of a flash can be prevented. This molding method comprises pouring or injecting the thermosetting resin into a mold, and then heating and molding it, and the method further comprises the step of locally heating an unnecessary gap and its peripheries of the mold, which are not concerned with the molding of the thermosetting resin into a desired article having a required shape, whereby the resin in the gap and its peripheries are promptly set to reduce the leakage of the resin into the unnecessary gap.

10 Claims, 1 Drawing Sheet

MOLDING METHOD OF THERMOSETTING RESIN AND MOLD WITH UNNECESSARY GAP HEATING

BACKGROUND OF THE INVENTION

1. Field of the Invention

The present invention relates to a molding method of a thermosetting resin in which molding is carried out by pouring or injecting a thermosetting resin into a mold and then heating the same, a mold for the molding and a molded article.

2. Related Background Art

In a conventional molding of a thermosetting resin, an extra portion is usually attached to a molded article due to the leakage of the resin in the case of a molding method in which the thermosetting resin is poured or injected into a mold. For the molded article with the extra portion (hereinafter referred to as "flash") due to the leakage of the resin, a step of deflashing is required after the molded article has been taken out of the mold.

In recent years, injection molding has often been used, which permitted the molding in a short period of time. Most of all, however, among integral molding techniques, an insert molding method is utilized, in which parts of a metal or the like are placed in the mold, and then the resin is injected into the mold to obtain an integrally molded article.

In such a molding technique, in order to omit the deflashing step after the molding, various methods for reducing the flash at the molding have been suggested. In such methods, however, the mold having a very high precision is required, and in the case of the insert molding, the parts to be inserted must have a very high dimensional accuracy. In addition, it is necessary to strictly control the amount of the resin that is poured or injected into the mold, which makes the molding itself very difficult.

In the injection molding of the thermosetting resin, the mold to be used is manufactured with a very high dimensional accuracy on the basis of a calculation involving a thermal expansion of a mold material, in view of the fact that the temperature of the mold rises to a high level due to the setting of the resin and most of the thermosetting resins are liquid before the setting.

However, even if it is attempted to manufacture the mold with the high precision, the working of the mold is limited, and it is impossible to have an error of zero. Usually, there is an error of about 0.01 mm or less.

For example, an insert is usually manufactured by pressing a metallic plate to blank it, but at the time of the blanking, a step (or a difference in level) is formed between the flash side and the sag side of the surface of the blanked plate, and this step causes the flash.

For example, a zinc-coated steel plate, which is a metallic steel plate, is blanked by the use of a blanking mold that is 0.06 to 0.07 mm smaller than a predetermined size, but at this time, a difference in level (unevenness on a blanked section formed by the blanking) is formed between the blanked side and the flash side. The softer the material of the mold is, the larger this step is, and usually, when the soft material is used, the step further increases as much as about 0.02 to 0.03 mm.

As described above, the mold has a tolerance of 0.01 mm or less as its precision, and the metallic plate to be inserted, e.g., the above zinc-coated steel plate, also has a size tolerance of 0.06 to 0.07 mm. In consequence, a gap of about 0.07 mm is always present between the mold and the insert.

For example, in the injection molding of a silicone rubber, which is one of the thermosetting resins having a low viscosity, the molding is possible even at the tip of the gap of 0.07 mm.

In the general injection molding, the molding is carried out at a high speed and under a high pressure, so that a large amount of the resin inconveniently leaks out. That is to say, if it is attempted to prevent the leakage of the resin, the pressure cannot be applied to the mold, so that fine air bubbles remain in the resin article, resulting in a poor function of the article.

Furthermore, because of the leakage of the resin, the flash may stop an automatic conveyor line, which may lead to the drop in operating efficiency. Moreover, the deflashing process is naturally required, and it is very difficult to remove a very small flash by an automatic device, and hence, cost noticeably increases. In addition, since the thermosetting resin, which cannot be effectively recycled, is used, the amount of waste materials increases. Thus, injection molding increases cost and causes environmental problems.

SUMMARY OF THE INVENTION

Accordingly, the present invention has been developed in view of the above problems, and its object is to provide a molding method of a thermosetting resin in which the formation of a flash can be prevented, a mold for the molding, and a molded article.

In order to solve the above problems and to achieve the above object, the present invention is directed to a molding method of a thermosetting resin, which comprises pouring or injecting the thermosetting resin into a mold, and then heating and molding it. This method comprises the step of locally heating an unnecessary gap and its peripheries of the mold, which are not concerned with the molding of the thermosetting resin into a desired article having a required shape, whereby the resin in the gap and its peripheries is promptly set to reduce the leakage of the resin into the unnecessary gap.

That is to say, according to the present invention, when a thermosetting resin is molded, a heat source is disposed at a resin leakage portion in a mold to promptly heat its resin leakage portion alone, whereby the resin in the resin leakage portion is promptly set to form a packing of the set resin, so that the leakage of the resin can be prevented. As a result, a molded article of the thermosetting resin free from flash can be produced.

DETAILED DESCRIPTION OF THE PREFERRED EMBODIMENTS

In the molding method of thermosetting resin according to the present invention, an example of the unnecessary gap portion is a joint portion between one mold and another mold.

Furthermore, another example of the unnecessary gap portion is a gap between an insert member inserted in a cavity of the mold and the cavity.

In the molding method of thermosetting resin according to the present invention, the local heating of the unnecessary gap and its peripheries is suitably carried out by the use of electromagnetic induction.

In addition, the mold for molding according to the present invention is a mold into which a thermosetting resin is poured or injected and which is heated to carry out the molding. The mold comprises a local heating means for locally controlling the temperature in the unnecessary gap and its peripheries of the mold, which are not concerned with the molding of the thermosetting resin into a desired article having a required shape.

The present invention will be described below in detail in accordance with one suitable embodiment with reference to the attached drawings.

For example, in the injection molding of a thermosetting silicone rubber, which is one of the thermosetting resins having the lowest viscosity, the minimum thickness of the rubber that can flow in the form of a thin flow path is considered to be 0.005 mm. The flowability of a material depends on a pressure applied to the material, viscosity of the material at the temperature of the mold, and the relation between a setting time and a setting rate of the material at this temperature.

Here, the viscosity of the resin in a liquid state before the setting is suitably in the range of 1 to 1,000 Pa.s. Furthermore, the temperature of the mold at the time of the molding of the resin is preferably in the range of 100 to 200° C. In the case of mass production, if the temperature of the mold is less than 100° C., the setting rate is too low, which is impractical, compared with conventional thermosetting resins. Conversely, if it is more than 200° C., decomposition tends to begin, which is also impractical, compared with conventional thermosetting resins. In addition, the setting time of the resin can be determined by conversion from the setting characteristics of the material and the temperature of the mold.

In this embodiment, a metallic plate is inserted as an insert into the mold heated to a high temperature, and afterwards, the thermoplastic resin is molded by an injection molding machine. In this case, the gap between the mold and the insert plate is set to 0.1 mm or less to facilitate the transfer of heat to the resin, so that the setting of the resin that passes through the difference in level between the flash side and the sag side of the blanked surface of the metallic plate is accelerated and the set resin plays the role of a packing for preventing the leakage of the resin.

Figure 1:
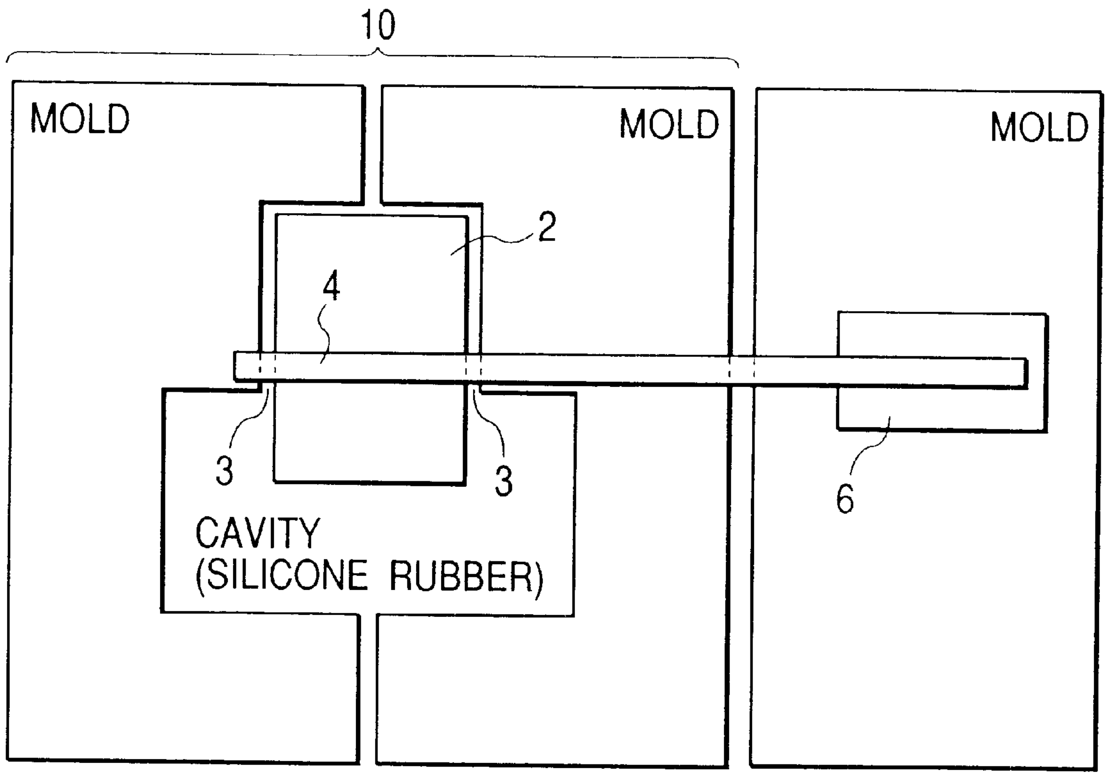
FIG. 1 shows a structure of a mold in one embodiment.
Figure 2:
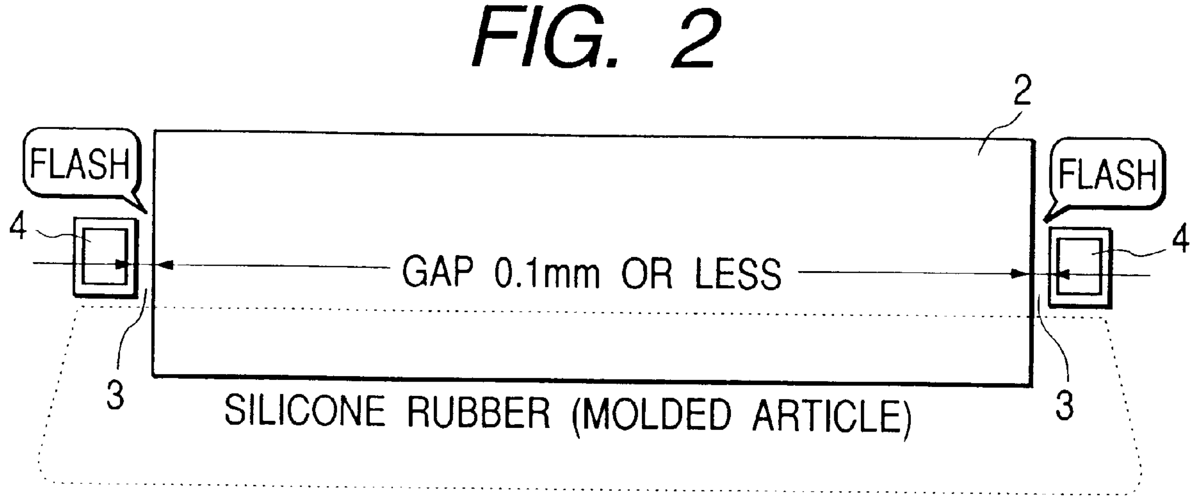
FIG. 2 is an illustrative view of a molded article in an Example.

Furthermore, as shown in FIGS. 1 and 2, a heating piece 4 connected to a magnetic induction heating device 6, which is a heat source, is attached to a mold portion close to a leakage portion (the gap) 3 of an end portion of a metallic plate 2, which is an insert. Then, a mold 10 is locally heated, whereby the resin alone in the vicinity of the leakage portion 3 is set earlier than the other portion of the resin to form a packing portion comprising a seal of the set resin in the leakage portion 3. In consequence, the leakage of the resin from the leakage portion 3, i.e., the problem of the flash, can be solved.

The heat source that may be used in the present invention preferably satisfies the following requirements.

(1) When the other portion of the resin is exposed to a high temperature for a long time, the resin deteriorates, and therefore, the heat source is to raise and lower the temperature every shot.

(2) Since it is required that the mold is locally heated to a fairly high temperature, a usual coil heater that is cut at a temperature higher than 300° C. cannot be used as the heat source.

(3) The heat source is to be excellent in response so as to promptly heat the mold to the high temperature every shot.

These requirements have been intensively investigated, and as a result, it has been found that the use of a magnetic induction heating system is preferable.

In the present invention, known thermosetting resins for the injection molding can be used, but the lower the viscosity of the thermosetting resin, the larger the flash inhibition effect. In general, many rubber-based materials are low in their viscosity.

Examples of the rubber-based materials include liquid silicone rubbers, millable silicone rubbers, polyurethane rubbers, modified rubbers thereof, and blends thereof.

Furthermore, usually usable examples of the insert parts made of metals or the like include stainless steel plates inclusive of zinc-coated steel plates, phosphorus bronze plates, aluminum plates and heat-resistant resin plates.

The present invention will be described below in detail in accordance with Examples using the mold structures shown in FIGS. 1 and 2 as well as Comparative Examples.

EXAMPLE 1

A zinc-coated steel plate having a thickness of 1.6 mm coated with a primer for silicone (trade name 23042, made by Bayer) was placed in a mold heated to 100° C., and an LTV silicone rubber (trade name LSR AI3601, made by Bayer) was then injected into the mold through an injection molding machine (trade name ALL ROUNDER 520C, made by ARBURG). In this case, a gap of a leakage portion at the end portion of the plate was set to 0.1 mm, and this leakage portion was then heated to 250° C. in about 7 seconds prior to the injection of the liquid rubber by a magnetic induction heating device (made by Jyuou Co., Ltd.) to set the injected liquid rubber in the leakage portion, thereby forming a leakage stopper of the rubber. At this time, a cavity was filled with the rubber. After 20 minutes, the molded article was taken out of the mold and then subjected to a heat treatment at 200° C. for 4 hours to obtain a rubber elastomer having a hardness of 40°.

Then, a leakage amount of the rubber through the blanked surface at the end portion of the plate was measured.

EXAMPLE 2

A zinc-coated steel plate having a thickness of 1.6 mm coated with a primer for silicone (trade name 23042, made by Bayer) was placed in a mold heated to 180° C., and an LTV silicone rubber (trade name LSR AI3601, made by Bayer) was then injected into the mold through an injection molding machine (trade name ALL ROUNDER 520C, made by ARBURG). In this case, a gap of a leakage portion at the end portion of the plate was set to 0.1 mm, and this leakage portion was then heated to 300° C. in about 5 seconds prior to the injection of the liquid rubber by a magnetic induction heating device (made by Jyuou Co., Ltd.) to set the injected liquid rubber in the leakage portion, thereby forming a leakage stopper of the rubber. At this time, a cavity was filled with the rubber. After 40 seconds, the molded article was taken out of the mold and then subjected to a heat treatment at 200° C. for 4 hours to obtain a rubber elastomer having a hardness of 40°.

Then, a leakage amount of the rubber through the blanked surface at the end portion of the plate was measured.

EXAMPLE 3

A zinc-coated steel plate having a thickness of 1.6 mm coated with a primer for silicone (trade name 23042, made by Bayer) was placed in a mold heated to 200° C., and an LTV silicone rubber (trade name LSR AI3601, made by Bayer) was then injected into the mold through an injection molding machine (trade name ALL ROUNDER 520C, made by ARBURG). In this case, a gap of a leakage portion at the end portion of the plate was set to 0.1 mm, and this leakage portion was then heated to 320° C. in about 5 seconds prior to the injection of the liquid rubber by a magnetic induction heating device (made by Jyuou Co., Ltd.) to set the injected liquid rubber in the leakage portion, thereby forming a leakage stopper of the rubber. At this time, a cavity was filled with the rubber. After 25 seconds, the molded article was taken out of the mold and then subjected to a heat treatment at 200° C. for 4 hours to obtain a rubber elastomer having a hardness of 40°.

Then, a leakage amount of the rubber through the blanked surface at the end portion of the plate was measured.

EXAMPLE 4

A zinc-coated steel plate having a thickness of 1.6 mm coated with a primer for silicone (trade name 23042, made by Bayer) was placed in a mold heated to 180° C., and an LTV silicone rubber (trade name LSR AI3601, made by Bayer) was then injected into the mold through an injection molding machine (trade name ALL ROUNDER 520C, made by ARBURG). In this case, a gap of a leakage portion at the end portion of the plate was set to 0.15 mm, and this leakage portion was then heated to 300° C. in about 5 seconds prior to the injection of the liquid rubber by a magnetic induction heating device (made by Jyuou Co., Ltd.) to set the injected liquid rubber in the leakage portion, thereby forming a leakage stopper of the rubber. At this time, a cavity was filled with the rubber. After 40 seconds, the molded article was taken out of the mold, and then subjected to a heat treatment at 200° C. for 4 hours to obtain a rubber elastomer having a hardness of 40°.

Then, a leakage amount of the rubber through the blanked surface at the end portion of the plate was measured.

Comparative Example 1

A zinc-coated steel plate having a thickness of 1.6 mm coated with a primer for silicone (trade name 23042, made by Bayer) was placed in a mold heated to 100° C., and an LTV silicone rubber (trade name LSR AI3601, made by Bayer) was then injected into the mold through an injection molding machine (trade name ALL ROUNDER 520C, made by ARBURG). In this case, a gap of a leakage portion at the end portion of the plate was set to 0.1 mm, and a cavity was filled with the rubber. After 20 minutes, the molded article was taken out of the mold and then subjected to a heat treatment at 200° C. for 4 hours to obtain a rubber elastomer having a hardness of 40°. Then, a leakage amount of the rubber through the blanked surface at the end portion of the plate was measured.

Comparative Example 2

A zinc-coated steel plate having a thickness of 1.6 mm coated with a primer for silicone (trade name 23042, made by Bayer) was placed in a mold heated to 100° C., and an LTV silicone rubber (trade name LSR AI3601, made by Bayer) was then injected into the mold through an injection molding machine (trade name ALL ROUNDER 520C, made by ARBURG). In this case, a gap of a leakage portion at the end portion of the plate was set to 0.05 mm, and a cavity was filled with the rubber. After 20 minutes, the molded article was taken out of the mold and then subjected to a heat treatment at 200° C. for 4 hours to obtain a rubber elastomer having a hardness of 40°. Then, a leakage amount of the rubber through the blanked surface at the end portion of the plate was measured.

Comparative Example 3

A zinc-coated steel plate having a thickness of 1.6 mm coated with a primer for silicone (trade name 23042, made by Bayer) was placed in a mold heated to 180° C., and an LTV silicone rubber (trade name LSR AI3601, made by Bayer) was then injected into the mold through an injection molding machine (trade name ALL ROUNDER 520C, made by ARBURG). In this case, a gap of a leakage portion at the end portion of the plate was set to 0.05 mm, and a cavity was filled with the rubber. After 40 seconds, the molded article was taken out of the mold and then subjected to a heat treatment at 200° C. for 4 hours to obtain a rubber elastomer having a hardness of 40°. Then, a leakage amount of the rubber through the blanked surface at the end portion of the plate was measured.

Comparative Example 4

A zinc-coated steel plate having a thickness of 1.6 mm coated with a primer for silicone (trade name 23042, made by Bayer) was placed in a mold heated to 180° C., and an LTV silicone rubber (trade name LSR AI3601, made by Bayer) was then injected into the mold through an injection molding machine (trade name ALL ROUNDER 520C, made by ARBURG). In this case, a gap of a leakage portion at the end portion of the plate was set to 0.1 mm, and this leakage portion was then heated to 300° C. in about 30 seconds prior to the injection of the liquid rubber by a coil heater to early set the injected liquid rubber in the leakage portion, thereby forming a leakage stopper of the rubber. At this time, a cavity was filled with the rubber. After 40 seconds, the molded article was taken out of the mold and then subjected to a heat treatment at 200° C. for 4 hours to obtain a rubber elastomer having a hardness of 40°. Then, a leakage amount of the rubber through the blanked surface at the end portion of the plate was measured.

Table 1 shows the comparative results of the leakage amounts of the rubbers at the end portions of the plates in the molding carried out in the above Examples and Comparative Examples.

TABLE 1

| | Example 1 | Example 2 | Example 3 | Example 4 |
|---|---|---|---|---|
| State of Flash Leakage Amount (mmg/g) | Thin film only 3/0.1 or less | Thin film only 1.5/0.1 or less | Thin filrn only 1.0/0.1 or less | Thin film only 2.5/0.1 or less |
| Comp. Ex. 1 | Comp. Ex. 2 | Comp. Ex. 3 | Cornp. Ex. 4 | |
| State of Flash Leakage Amount (mmg/g) | Shape was formed 50.0/1.3 | Shape was formed 30.0/1.1 | Shape was formed 25.0/1.0 | Thin film only 1.5/0.1 or less |

With regard to the conditions for injection in all the cases, an injection ratio was 3.0 cc/sec and an injection pressure was about 1,200 bar, and the leakage amount was evaluated by length (mm) and weight (g).

It is apparent from the results in Table 1 that in each of Examples 1 to 4, the leakage amount of the rubber through the blanked surface at the end portion of the insert plate was very small. On the other hand, in each of Comparative Examples 1 to 3, the leakage amount of the rubber through the blanked surface at the end portion of the insert plate was large. While in Comparative Example 4 the leakage of the rubber was scarcely observed, the temperature was increased over a lengthy period of time, thereby prolonging the molding cycle. Furthermore, the temperature was elevated even at the periphery of the mold, resulting in whitening that occurred due to the deterioration of the rubber. In addition, during continuous use, the temperature was repeatedly raised to 300° C., and probably for this operation, the coil of the coil heater was cut, hence it could no longer be used.

What is claimed is:

1. A molding method of a thermosetting resin which comprises pouring or injecting the thermosetting resin into a mold, and then heating and molding it, said method comprising the step of locally heating an unnecessary gap and its peripheries of the mold which are not concerned with the molding of the thermosetting resin into a desired article having a required shape, whereby the resin in the gap and its peripheries is promptly set to reduce the leakage of the resin into the unnecessary gap.

2. The molding method of the thermosetting resin according to claim 1 wherein the unnecessary gap is a joint portion between one mold and another mold.

3. The molding method of the thermosetting resin according to claim 1 wherein the unnecessary gap is a gap between an insert member inserted in a cavity of the mold and the cavity.

4. The molding method of the thermosetting resin according to claim 3, wherein the thermosetting resin is silicone rubber.

5. The molding method of the thermosetting resin according to claim 1 wherein the local heating of the unnecessary gap and its peripheries is carried out by the use of electromagnetic induction.

6. The molding method of the thermosetting resin according to claim 1, wherein the thermosetting resin is silicone rubber.

7. A mold for molding which is carried out by pouring or injecting and then heating a thermosetting resin, said mold comprising local heating means for locally controlling a temperature in an unnecessary gap and its peripheries of the mold which are not concerned with the molding of the thermosetting resin into a desired article having a required shape.

8. The mold for molding according to claim 7 wherein the unnecessary gap is a joint portion between one mold and another mold.

9. The mold for molding according to claim 7 wherein the unnecessary gap is a gap between an insert member inserted in a cavity of the mold and the cavity.

10. The mold for molding according to claim 7 wherein the local heating means is heating means using electromagnetic induction.

* * * * *

UNITED STATES PATENT AND TRADEMARK OFFICE

CERTIFICATE OF CORRECTION

PATENT NO. : 6,447,707 B1
DATED : September 10, 2002
INVENTOR(S) : Kenichi Sakai et al.

It is certified that error appears in the above-identified patent and that said Letters Patent is hereby corrected as shown below:

Column 1,
Line 42, "resin" should read -- resin, --.

Column 4,
Line 23, "23042" should read -- Z3042 --;
Line 44, "23042" should read -- Z3042 --;
Line 66, "23042" should read -- Z3042 --.

Column 5,
Line 20, "23042" should read -- Z3042 --;
Line 33, "mold," should read -- mold --;
Line 41, "23042" should read --Z3042 --;
Line 57, "23042" should read --Z3042 --.

Column 6,
Line 7, "23042" should read -- Z3042 --;
Line 23, "23042" should read -- Z3042 --;
Line 54, move

| | | | |
|---|---|---|---|
| "Comp. Exh. 1 | Comp. Ex. 2 | Comp. Ex. 3 | Comp. Ex. 4" |

respectively one column to the right as follows:

| | | | | |
|---|---|---|---|---|
| | -- Comp. Exh. 1 | Comp. Ex. 2 | Comp. Ex. 3 | Comp. Ex. 4 --. |

Column 7,
Line 17, "comprising" should read -- comprising: --;
Line 25, "claim 1" should read -- claim 1, --;
Line 28, "claim 1" should read -- claim 1, --.

UNITED STATES PATENT AND TRADEMARK OFFICE
CERTIFICATE OF CORRECTION

PATENT NO. : 6,447,707 B1
DATED : September 10, 2002
INVENTOR(S) : Kenichi Sakai et al.

It is certified that error appears in the above-identified patent and that said Letters Patent is hereby corrected as shown below:

Column 8,
Line 5, "claim 1" should read -- claim 1, --;
Line 13, "comprising" should read -- comprising: --;
Line 20, "claim 7" should read -- claim 7, --;
Line 23, "claim 7" should read -- claim 7, --;
Line 26, "claim 7" should read -- claim 7, --.

Signed and Sealed this

Eleventh Day of March, 2003

JAMES E. ROGAN
*Director of the United States Patent and Trademark Office*